(12) United States Patent
Savatsky et al.

(10) Patent No.: US 10,975,183 B2
(45) Date of Patent: Apr. 13, 2021

(54) PILOT PLANT SCALE SEMI-CONDENSING OPERATION

(71) Applicant: ExxonMobil Chemical Patents Inc., Baytown, TX (US)

(72) Inventors: Bruce J. Savatsky, Kingwood, TX (US); Richard E. Pequeno, Baytown, TX (US); Brandon C. Locklear, Tokyo (JP)

(73) Assignee: ExxonMobil Chemical Patents Inc., Baytown, TX (US)

( * ) Notice: Subject to any disclaimer, the term of this patent is extended or adjusted under 35 U.S.C. 154(b) by 170 days.

(21) Appl. No.: 16/324,803

(22) PCT Filed: Mar. 29, 2017

(86) PCT No.: PCT/US2017/024683
§ 371 (c)(1),
(2) Date: Feb. 11, 2019

(87) PCT Pub. No.: WO2018/048472
PCT Pub. Date: Mar. 15, 2018

(65) Prior Publication Data
US 2019/0169335 A1    Jun. 6, 2019

Related U.S. Application Data

(60) Provisional application No. 62/385,536, filed on Sep. 9, 2016.

(51) Int. Cl.
*C08F 210/16* (2006.01)
*C08F 2/34* (2006.01)
(Continued)

(52) U.S. Cl.
CPC ........... *C08F 210/16* (2013.01); *B01J 8/1827* (2013.01); *B01J 8/1836* (2013.01); *C08F 2/00* (2013.01);
(Continued)

(58) Field of Classification Search
USPC ............................................. 526/68; 422/140
See application file for complete search history.

(56) References Cited

U.S. PATENT DOCUMENTS

2010/0022720 A1    1/2010    Sandell et al.

FOREIGN PATENT DOCUMENTS

| EP | 0814100 A | 12/1997 |
|---|---|---|
| WO | 94/28032 A | 12/1994 |
| WO | 00/69552 A | 11/2000 |

*Primary Examiner* — Fred M Teskin
(74) *Attorney, Agent, or Firm* — ExxonMobil Chemical Patents Inc.—Law Department

(57) ABSTRACT

A process for testing a commercial polyolefin condensed mode operation on a pilot plant scale is provided. A feed stream including one or more olefin monomers and one or more inert fluids can be introduced to a fluidized bed contained within a reactor housing having a length to diameter ratio of 1.0 to 20. The one or more olefin monomers can be contacted with one or catalysts within the fluidized bed at conditions sufficient to produce a polyolefin. A cycle gas stream can be withdrawn from the housing, the cycle gas stream having a gas velocity of 1.0 ft/sec to 3.0 ft/sec and including the unreacted monomers and the inert fluids. The cycle gas stream can be compressed to a pressure above the reaction pressure within the housing. The cycle gas stream can be cooled to a temperature that is above the dew point of the cycle gas, and a portion of the compressed cycle gas stream can be removed to create a side stream of the compressed cycle gas stream. The side stream can be cooled to a temperature that is below its dew point to create (Continued)

a gas-liquid mixture, and the cycle gas stream and the cooled side stream including the gas-liquid mixture can be returned to the reactor housing.

15 Claims, 1 Drawing Sheet

(51) Int. Cl.
    *C08F 2/00*     (2006.01)
    *C08F 2/01*     (2006.01)
    *B01J 8/18*     (2006.01)
    *B01J 8/24*     (2006.01)

(52) U.S. Cl.
    CPC .................. *C08F 2/01* (2013.01); *C08F 2/34* (2013.01); *C08F 2800/10* (2013.01)

PILOT PLANT SCALE SEMI-CONDENSING OPERATION

CROSS-REFERENCE OF RELATED APPLICATIONS

Priority Claim

This application is a National Phase Application claiming priority to PCT Application Serial No. PCT/US2017/024683 filed Mar. 29, 2017, which claims priority to and the benefit of U.S. Provisional Ser. No. 62/385,536, filed Sep. 9, 2016, the disclosure of which are fully incorporated herein by reference in their entireties.

FIELD OF THE INVENTION

Embodiments described generally relate to gas phase polymerization. More particularly, embodiments described herein relate to pilot plant scale operations of gas phase polyolefin polymerization.

BACKGROUND OF THE INVENTION

In commercial gas phase polymerization processes, a gaseous stream containing one or more monomers is passed through a fluidized bed under reactive conditions in the presence of a catalyst. A polymer product is withdrawn from the reactor while fresh monomer is introduced to the reactor to replace the removed polymerized product. Unreacted monomer and catalyst is withdrawn from the fluidized bed and recycled back to the reactor.

Commercial gas phase polymerization processes usually operate in condensed mode. Condensed mode operation is achieved when a portion of the reactor cycle gas is condensed into liquids before the gas enters the bottom of the reactor. The reactor cycle gas is typically condensed by a combination of two things. The first is increasing the concentration of an induced condensing agent (ICA), usually isopentane, to increase the cycle gas dew point temperature. The second is increasing reactor rates to lower the temperature of the cycle gas below its dew point. As production rates increase, the cycle gas cooler lowers the cycle gas temperature to offset the heat of reaction and maintain a steady reactor temperature. The combination of the higher dew point temperature and the lower cycle gas temperature leads to condensation in the cycle gas. The condensed liquid is used to vaporize in the reactor, which removes more of the heat. As such, operating in condensed mode allows otherwise cooling limited plants to increase production rates by improving system heat removal.

Pilot plants have been used to mimic commercial systems on a small scale. Pilot plants are cheaper to build and cheaper to operate. Pilot plants allow an operator a less expensive way to experiment, investigate and trouble shoot problems without the risks and expenses associated with larger scale productions.

Pilot plant reactors, however, are not capable of operating in condensed mode because production rates and heat removal systems are limited. Pilot plant reactors operate with a bottom bell temperature that is higher than commercial-scale reactors. The inlet temperature of a pilot plant reactor is typically 17° F. below reactor temperature at full rates. This difference between the inlet temperature and reactor temperature is much lower than commercial-scale reactors, where inlet temperatures are typically about 40° F. to 85° F. below reactor temperature.

There is a long felt but unresolved need to mimic condensed liquid effects in gas phase polymerizations using condensed mode on a smaller, pilot scale. Not having a capability to study at small scale creates capital and safety risks when trying new catalysts or making new polyolefin products at commercial scale. Some catalysts, for example, might cause severe fouling problems as soon as liquids are formed in a commercial reactor and cause plant shut-downs. Condensing liquids might also increase the formations of sheets or agglomerates or cause gels in sensitive polyolefin products.

The only option to date has been to blindly scale-up new catalyst and product technology to large scale commercial plants that operate at high space time yields ("STY"). STY is the polymer production rate per reactor bed volume (lb/hr per cubic foot of reactor bed volume) in condense mode. This option, however, takes on the risks of shutting down the large commercial plant when something goes awry.

There remains a need, therefore, for new systems and methods to mimic commercial reactor operation at commercial gas velocities in condense mode to study the role of the condense mode in pilot plant facilities.

SUMMARY OF THE INVENTION

A process for testing a commercial polyolefin condensed mode operation on a pilot plant scale is provided. The process comprises flowing one or more olefin monomers and one or more inert fluids to a fluidized bed contained within a reactor housing having a length to diameter ratio of 1.0 to 20. The one or more olefin monomers can be contacted with one or catalysts within the fluidized bed at conditions sufficient to produce a polyolefin. A cycle gas stream can be withdrawn from the housing. The cycle gas stream can have a gas velocity of 1.0 ft/sec to 3.0 ft/sec and include the unreacted monomers and the inert fluids. The cycle gas stream can be compressed to a pressure above the reaction pressure within the housing, and the cycle gas stream can be cooled to a temperature that is above the dew point of the cycle gas. A portion of the compressed cycle gas stream can be removed to create a side stream of the compressed cycle gas stream, and the side stream can be cooled to a temperature that is below its dew point to create a gas-liquid mixture. The cycle gas stream and the cooled side stream comprising the gas-liquid mixture can be returned to the reactor housing.

A pilot scale polymerization system for olefin polymerization is also provided. The system can include a polymerization reactor housing a fluidized bed comprising polymer particles; a recycle loop in fluid communication with the polymerization reactor, wherein the recycle loop comprises a first cooler for cooling the entire recycle gas stream from the reactor; a compressor for compressing the entire, cooled recycle gas stream; and a second cooler for cooling a portion of the compressed recycle gas stream to provide a condensed, liquid phase side stream.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this disclosure is combined with publicly available information and technology.

Figure 1:
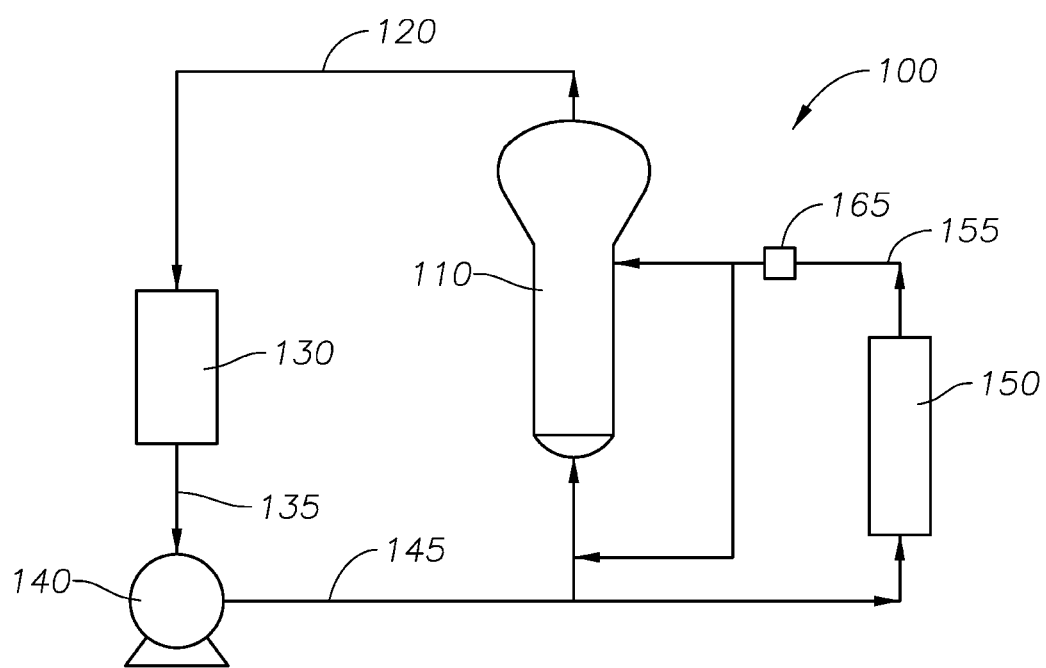
FIG. 1 illustrates a pilot plant scale reactor system that mimics commercial scale condensed mode operations, according to one or more embodiments described herein.

FIG. 1 illustrates a pilot plant scale reactor system 100 utilizing a secondary cooler 150 to mimic commercial condensed mode, according to one or more embodiments. The reactor system 100 provides the ability to generate condensed liquids on a small pilot scale while using typical commercial size fluidized bed reactor gas velocities and typical commercial size fluidized bed reactor L/Ds (height/diameter ratio).

The system 100 can include a reactor housing 110, a cycle gas cooler 130, a cycle gas compressor 140, and a side stream or secondary cooler 150. A cycle gas stream 120 can exit the reactor housing 110 and can be cooled using the cycle gas cooler 130 to provide a cooled cycle gas stream 135 that can be compressed using the cycle gas compressor 140 to provide a compressed cycle gas stream 145. At least a portion of the compressed cycle gas stream 145 can be diverted to the secondary cooler 150 where this diverted side stream can be cooled to a temperature sufficient to form condensed liquid, i.e., cooled to a temperature below the dew point of the side stream, providing a gas-liquid mixture in stream 155.

There are numerous options for returning the gas-liquid mixture in stream 155 from the side stream cooler 150 to the reactor housing 110. For example, this two phase mixture can be sent directly to a nozzle on the side of the reactor 110 where it enters the reactor bed as the two phase flow goes into a commercial scale reactor. The gas-liquid mixture in stream 155 from the side stream cooler 150 also can be fed back into the compressed cycle gas stream 145. The gas-liquid mixture in stream 155 from the side stream cooler 150 also can be sent to a mini-distributor plate (with fewer holes compared to a distributor plate of a commercial scale reactor). The mini-distributor plate 165 could have the same flow to hole ratio as a commercial scale reactor that is being studied to collect data about the potential for fouling behavior. The gas-liquid mixture in stream 155 from the side stream cooler 150 also can be sampled in a sampling system to do analysis of the gas and liquids to look for components that might be precursors that cause fouling or gel formation or to investigate whether any reaction side products are formed. As used herein, the terms "commercial scale reactor" and "commercial reactor" are used interchangeably and refer to a reactor having a diameter of at least 8 feet, a bed height of at least 30 feet, and/or a production rate of at least 8,000 lbs polymer per hour.

As in a commercial size reactor, the fluidized bed within the reactor housing 110 has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor housing 110. To maintain a viable fluidized bed in the reactor housing 110, the superficial gas velocity through the bed must exceed the minimum flow required for fluidization. Preferably, the superficial gas velocity is at least two times the minimum flow velocity. Ordinarily, the superficial gas velocity ranges from about 1.0 ft/sec to about 5.0 ft/sec. The superficial gas velocity also can range from a low of about 1.0 ft/sec, about 1.5 ft/sec, or about 2.0 ft/sec to a high of about 3.0 ft/sec, about 4.0 ft/sec, or about 5.0 ft/sec.

The terms "feed" or "feed stream" refers to the reactor feed that includes a raw material, either gas phase or liquid phase, used in the polymerization process to produce the polymer product. For example, the feed stream can be any one or more olefin monomers including any one or more substituted and unsubstituted alkenes having two to 12 carbon atoms, such as ethylene, propylene, 1-butene, 1-pentene, 4-methyl-1-pentene, 1-hexene, 1-octene, 1-decene, 1-dodecene, styrene, and derivatives thereof. The feed can include one or more inert compounds such as one or more induced condensing agents or ICAs. ICAs can include, but are not limited to, alkanes that may be condensable in the polymerization process for removing the heat of reaction. Illustrative ICAs can include, but are not limited to, propane, butane, isobutane, pentane, isopentane, hexane, isohexane, or any combination thereof.

The ICA concentration within the reactor housing 110 can range from a low of about 1 mol %, about 5 mol %, or about 10 mol % to a high of about 25 mol %, about 35 mol %, or about 45 mol %. For example, the concentration of the ICA(s) can range from about 9 mol %, about 11 mol %, about 14 mol %, about 16 mol %, or about 18 mol % to a high of about 20 mol %, about 22 mol %, or about 24 mol %. Further details regarding ICAs are described in U.S. Pat. Nos. 5,352,749; 5,405,922; 5,436, 304; and 7,122,607; and WO Publication No. 2005/113615. The terms "condense mode", "condensed mode", and "condensing mode" are used interchangeably herein. Further details of such operation are further explained in U.S. Pat. Nos. 4,543,399 and 4,588,790.

The amount of hydrogen in the reactor housing 101 can be expressed as a mole ratio relative to the total polymerizable monomer, for example, ethylene or a blend of ethylene and one or more comonomers. The amount of hydrogen used in the polymerization process can be an amount necessary to achieve the desired flow index of the final polyolefin resin. The mole ratio of hydrogen to total monomer ($H_2$:monomer) can range from 0.0001 to 0.0005; 0.001 to about 10; 0.001 to about 5; 0.001 to about 3; 0.001 to about 0.10. The amount of hydrogen in the reactor housing 110 also can be 0.001 up to 3,000 ppm, 4,000 ppm, or 5,000 ppm. The mole ratio of hydrogen to total monomer ($H_2$:monomer) also can range from 50 ppm to 5,000 or 50 ppm to 2,000 ppm.

The total monomer concentration in the reactor housing 110 can be at least 20 mol %, at least 60 mol %, at least 70 mol %, at least 80 mol %, at least 90 mol %, at least 95 mol %, at least 96 mol %, at least 97 mol %, at least 98 mol %, at least 99 mol %, at least 99.9 mol %, or at least 99.99 mol %. In one or more embodiments, the reactor housing 110 can have an ethylene concentration of at least 20 mol %, at least 60 mol %, at least 70 mol %, at least 80 mol %, at least 90 mol %, at least 95 mol %, at least 96 mol %, at least 97 mol %, at least 98 mol %, at least 99 mol %, at least 99.9 mol %, or at least 99.99 mol %.

The main cycle gas stream 120 can have a flowrate ranging from a low of about 10,000 lb/hr, about 15,000 lb/hr, or about 20,000 lb/hr to a high of about 25,000 lb/hr, about 30,000 lb/hr, or about 50,000 lb/hr. The rates are significantly less than typical commercial rates that are about 300,000 lb/hr or more.

The reaction conditions within the reactor 110 vary depending upon the monomers, catalysts and equipment availability. The specific reaction conditions are known or readily derivable by those skilled in the art. For example, the reaction temperature can range from about −10° C. to about 120° C., such as about 15° C. to about 110° C. The reaction pressure can range from about 0.1 bar to about 100 bar, such as about 5 bar to about 50 bar, for example. The temperature and pressure of the main cycle gas stream 120 leaving the reactor 110 is nearly identical to that of the reaction conditions.

The cycle gas cooler 130 can be any apparatus or system capable of decreasing the temperature of the main cycle gas stream 120. The cycle gas cooler 130 can be used to lower the temperature of the main cycle gas by about 10° F., about 15° F., about 20° F., or about 30° F. The cycle gas cooler 130 can be any one or more shell-and-tube, plate and frame, plate and fin, spiral wound, coil wound, U-tube, fans, and/or bayonet style heat exchangers. Illustrative heat transfer mediums can include, but are not limited to, water, air, glycols, mixtures thereof, or the like.

The cycle gas compressor 140 increases the pressure of the cooled main cycle gas stream 135 exiting the cooler 130. The pressure of the cooled main cycle gas stream 135 exiting the cooler 130 can vary greatly, and is typically 10, 15, 20, or 25 psi above the reactor pressure.

The side stream cooler or secondary cooler 150 can be any apparatus or system capable of decreasing the temperature of the side stream to a temperature below the dew point of the cycle gas. The dew point of the cycle gas can vary and is dependent on the gas composition. The secondary cooler 150 can be any one or more shell-and-tube, plate and frame, plate and fin, spiral wound, coil wound, U-tube, fans, and/or bayonet style heat exchangers. Suitable heat transfer mediums can include, but are not limited to, water, air, glycols, mixtures thereof, or the like.

The side stream 155 can have a flowrate ranging from a low of about 100 lb/hr, about 500 lb/hr, or about 750 lb/hr to a high of about 1,000 lb/hr, about 2,000 lb/hr, or about 5,000 lb/hr. The temperature of the cooled side stream 155 can vary and can be, for example, about 70° F. to about 185° F., depending on the amount of cooling desired and the gas composition, or both. Depending on reaction conditions, the main cycle gas can have a temperature of at least 120° F., 130° F., 140° F. or 150° F. and the side stream of that cycle gas be cooled by the secondary cooler 150 to a temperature of about 70° F. to about 150° F. For example, the temperature of the side stream exiting the secondary cooler 150 via line 155 can range from a low of about 70° F., about 80° F., or about 90° F. to a high of about 120° F., about 135° F. or about 150° F. Depending on the amount of cooling desired, available cooling tower water can be used in the secondary cooler 150 to cool the side stream flow.

Any olefin polymerization catalyst or catalyst system can be used. For example, the catalyst or catalyst system can include Ziegler-Natta catalysts, chromium-based catalysts, metallocene catalysts and other single-site catalysts, and bimetallic catalysts. The catalyst or catalyst system can also include $AlCl_3$, cobalt, iron, palladium, chromium/chromium oxide or "Phillips" catalysts. Any catalyst can be used alone or in combination with the others.

The term "catalyst system" includes at least one "catalyst component" and at least one "activator", alternatively, at least one cocatalyst. The catalyst system may also include other components, such as supports, and is not limited to the catalyst component and/or activator alone or in combination. The catalyst system may include any number of catalyst components in any combination as described, as well as any activator in any combination as described.

The term "catalyst component" includes any compound that, once appropriately activated, is capable of catalyzing the polymerization or oligomerization of olefins. Preferably, the catalyst component includes at least one Group 3 to Group 12 atom and optionally at least one leaving group bound thereto.

The term "leaving group" refers to one or more chemical moieties bound to the metal center of the catalyst component that can be abstracted from the catalyst component by an activator, thereby producing the species active towards olefin polymerization or oligomerization. Suitable activators are described in detail below.

The term "substituted" means that the group following that term possesses at least one moiety in place of one or more hydrogens in any position, the moieties selected from such groups as halogen radicals (for example, $C_1$, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

The terms "metallocene" or "metallocene catalyst components" are used interchangeably and refer to "half sandwich" and "full sandwich" compounds having one or more substituted or unsubstituted cyclopentadienyl moiety (Cp) (typically two Cp moieties) bound to at least one Group 3 to Group 12 metal atom, and one or more leaving group(s) bound to the at least one metal atom.

The Cp ligands are one or more rings or ring system(s), at least a portion of which includes i-bonded systems, such as cycloalkadienyl ligands and heterocyclic analogues. The ring(s) or ring system(s) typically comprise atoms selected from the group consisting of Groups 13 to 16 atoms, or the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Or the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthrenyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "H4Ind"), substituted versions thereof, and heterocyclic versions thereof.

The "Group 15-containing catalyst" may include Group 3 to Group 12 metal complexes, wherein the metal is 2 to 8 coordinate, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing compounds are disclosed in, for example, WO 99/01460; EP A1 0 893 454; EP A1 0 894 005; U.S. Pat. Nos. 5,318,935; 5,889,128 6,333,389 B2 and 6,271,325 B1. In one embodiment, the Group 15-containing catalyst includes a Group 4 iminophenol complexes, Group 4 bis(amide) complexes, and Group 4 pyridyl-amide complexes that are active towards olefin polymerization to any extent.

The term "activator" includes any compound or combination of compounds, supported or unsupported, which can activate a single-site catalyst compound (e.g., metallocenes, Group 15-containing catalysts), such as by creating a cationic species from the catalyst component. Typically, this involves the abstraction of at least one leaving group (X group in the formulas/structures above) from the metal center of the catalyst component. The catalyst components of embodiments described are thus activated towards olefin polymerization using such activators. Embodiments of such activators include Lewis acids such as cyclic or oligomeric poly(hydrocarbylaluminum oxides) and so called non-coordinating activators ("NCA") (alternately, "ionizing activators" or "stoichiometric activators"), or any other compound that can convert a neutral metallocene catalyst component to a metallocene cation that is active with respect to olefin polymerization.

Lewis acids may be used to activate the metallocenes described. Illustrative Lewis acids include, but are not limited to, alumoxane (e.g., methyl alumoxane or methyl aluminoxane "MAO"), modified alumoxane (e.g., "TIBAO"), and alkylaluminum compounds. Ionizing activators (neutral or ionic) such as tri (n-butyl)ammonium tetrakis(pentafluorophenyl)boron may be also be used. Further, a trisperfluorophenyl boron metalloid precursor may be used. Any of those activators/precursors can be used alone or in combination with the others.

MAO and other aluminum-based activators are known in the art. Ionizing activators are known in the art and are described by, for example, Eugene You-Xian Chen & Tobin J. Marks, Cocatalysts for Metal-Catalyzed Olefin Polymerization: Activators, Activation Processes, and Structure-Activity Relationships 100(4) Chemical Reviews 1391-1434 (2000). The activators may be associated with or bound to a support, either in association with the catalyst component (e.g., metallocene) or separate from the catalyst component, such as described by Gregory G. Hlatky, Heterogeneous Single-Site Catalysts for Olefin Polymerization 100(4) Chemical REVIEWS 1347-1374 (2000).

Illustrative Ziegler-Natta catalyst compounds are disclosed in ZIEGLER CATALYSTS 363-386 (G. Fink, R. Mulhaupt and H. H. Brintzinger, eds., Springer-Verlag 1995); or in EP 103 120; EP 102 503; EP 0 231 102; EP 0 703 246; RE 33,683; U.S. Pat. Nos. 4,302,565; 5,518,973; 5,525,678; 5,288,933; 5,290,745; 5,093,415 and 6,562,905. Examples of such catalysts include those comprising Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Conventional-type transition metal catalysts are those traditional Ziegler-Natta catalysts that are well known in the art. Examples of conventional-type transition metal catalysts are discussed in U.S. Pat. Nos. 4,115,639, 4,077,904, 4,482, 687, 4,564,605, 4,721,763, 4,879,359 and 4,960,741. The conventional-type transition metal catalyst compounds that may be used include transition metal compounds from Groups 3 to 17, or Groups 4 to 12, or Groups 4 to 6 of the Periodic Table of Elements.

These conventional-type transition metal catalysts may be represented by the formula: MRx, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Examples of conventional-type transition metal catalysts where M is titanium include $TiCl_4$, $TiBr_4$, $Ti(OC_2H_5)_3$ Cl, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot 1/3AlCl_3$ and $Ti(OC_{12}H_{25})Cl_3$.

Conventional-type transition metal catalyst compounds based on magnesium/titanium electron-donor complexes are described in, for example, U.S. Pat. Nos. 4,302,565 and 4,302,566. Catalysts derived from Mg/Ti/Cl/THF are also contemplated, which are well known to those of ordinary skill in the art. One example of the general method of preparation of such a catalyst includes the following: dissolve $TiCl_4$ in THF, reduce the compound to $TiCl_3$ using Mg, add $MgCl_2$, and remove the solvent.

Conventional-type cocatalyst compounds for the above conventional-type transition metal catalyst compounds may be represented by the formula $M_3M_{4v}X_{2c}R_{3b-c}$, wherein $M_3$ is a metal from Group 1 to 3 and 12 to 13 of the Periodic Table of Elements; $M_4$ is a metal of Group 1 of the Periodic Table of Elements; v is a number from 0 to 1; each $X_2$ is any halogen; c is a number from 0 to 3; each $R_3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M_3R_3k$, where $M_3$ is a Group IA, IIA, IIB or IIIA metal, such as lithium, sodium, beryllium, barium, boron, aluminum, zinc, cadmium, and gallium; k equals 1, 2 or 3 depending upon the valency of $M_3$ which valency in turn normally depends upon the particular Group to which $M_3$ belongs; and each $R_3$ may be any monovalent radical that include hydrocarbon radicals and hydrocarbon radicals containing a Group 13 to 16 element like fluoride, aluminum or oxygen or a combination thereof.

A mixed catalyst system includes at least one metallocene catalyst component and at least one non-metallocene component. The mixed catalyst system may be described as a bimetallic catalyst composition or a multi-catalyst composition. As used herein, the terms "bimetallic catalyst composition" and "bimetallic catalyst" include any composition, mixture, or system that includes two or more different catalyst components, each having a different metal group. The terms "multi-catalyst composition" and "multi-catalyst" include any composition, mixture, or system that includes two or more different catalyst components regardless of the metals. Therefore, terms "bimetallic catalyst composition,"

"bimetallic catalyst," "multi-catalyst composition," and "multi-catalyst" will be collectively referred to herein as a "mixed catalyst system" unless specifically noted otherwise.

The catalyst system may be supported on a carrier, typically an inorganic oxide or chloride or a resinous material such as, for example, polyethylene or silica.

Suitable metallocene catalysts particularly include the silica supported hafnium transition metal metallocene/methylalumoxane catalyst systems described in, for example, U.S. Pat. Nos. 6,242,545 and 6,248,845, particularly Example 1. Hafnium and zirconium transition metal metallocene-type catalyst systems are particularly suitable. Other particularly suitable metallocene catalysts include those metallocene catalysts and catalyst systems described in, U.S. Pat. Nos. 5,466,649; 6,476,171; 6,225,426, and 7,951,873, and in the references cited therein, all of which are fully incorporated herein by reference.

Figure 2:
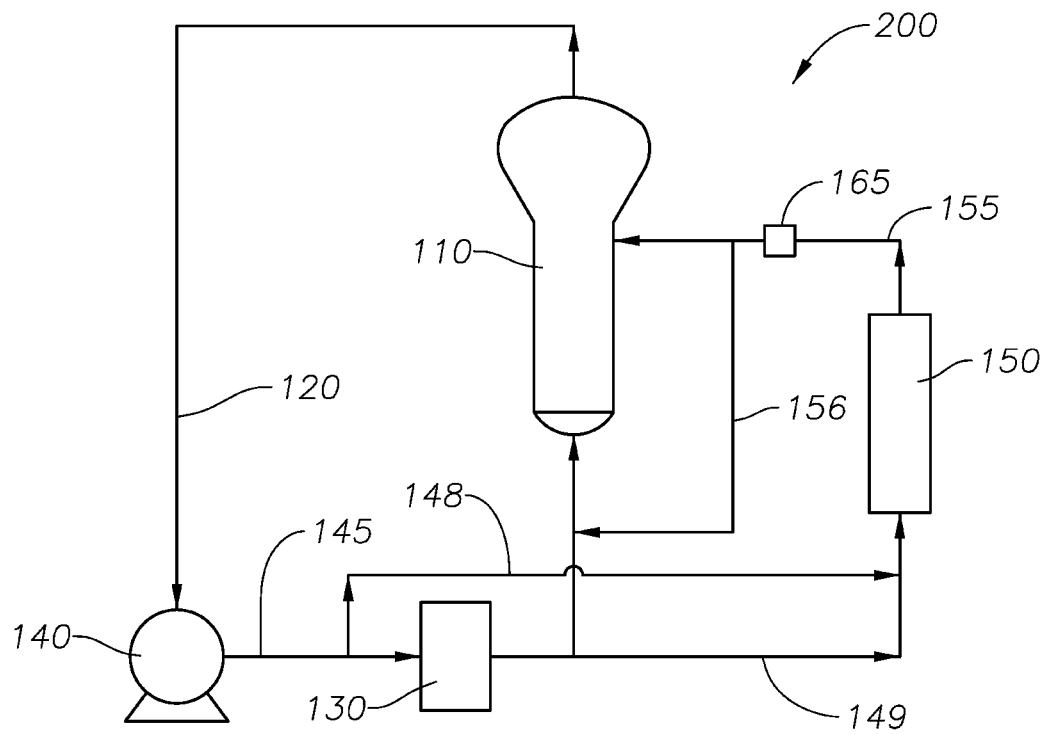
FIG. 2 illustrates an alternative pilot plant scale reactor system that mimics commercial scale condensed mode operations, according to one or more additional embodiments described herein.

FIG. 2 illustrates an alternative pilot scale reactor system 200 utilizing the secondary cooler 150 to mimic condensed mode, according to one or more other embodiments. In this configuration, the cycle gas compressor 140 can be located upstream of the main cycle gas cooler 130, and the take-off side stream to the secondary cooler 150 can be either upstream (stream 148) or downstream (stream 149) of the main cycle gas cooler 130, as depicted in FIG. 2.

As in the FIG. 1 configuration, there are multiple options for feeding the cooled, gas-liquid mixture in stream 155 back to the reactor housing. The gas-liquid mixture in stream 155 can be sent directly to a nozzle on the side of the reactor 110 as done in a typical commercial sized reactor. The gas-liquid mixture in stream 155 also can be fed back into the compressed cycle gas stream 145 via stream 156. The gas-liquid mixture in stream 155 also can be sent to the mini-distributor plate 165 having the same flow to hole ratio as a commercial scale reactor that is being studied to collect data about the potential for fouling behavior. The gas-liquid mixture in stream 155 also can be sampled in a sampling system to do analysis of the gas and liquids.

Referring to both FIG. 1 and FIG. 2, the reactor housing 110 is a pilot plant scale reactor, which is sized and operated at conditions to mimic a commercial scale reactor. Due to its relatively small size and inherent heat transfer limitations, the reactor housing 110 can produce from about 1 lb of polymer per hour to about 150 lb/hr. The reactor housing 110 can have a circular cross sectional shape, although it can be elliptical, square, rectangular, or multi-sided. The length or height of the reactor housing 110 can be about 2, 5 or 10 feet to about 15, 20 or 25 feet. The diameter or width of the reactor housing 110 can be about 6, 10, or 12 inches to about 26, 36, or 60 inches. The height to diameter ratio (L/D) can vary in the range of from about 2:1 to about 20:1. For example, the reactor housing 110 can have a height to diameter ratio of 20:1; 15:1; 10:1; 5:1; 3:1 or 2:1.

The pilot scale systems 100, 200 can provide a small scale version of a polymerization process having the same or nearly identical fluidized bed reactor gas velocities and L/D as a commercial polymerization process by condensing only a portion of the cycle gas. In addition to mimicking the reaction conditions of a commercial reactor using condensed mode, the condensed side stream 155 from the secondary cooler 150 provides a way to collect samples of condensed liquids, which provides a mechanism to identify the possibilities of fouling formation, side products formation, or even the measurement of the electrostatics or other properties of the condensed liquid.

The temperature of the side stream 155 should be sufficient to form condensed liquids therein. From a cooling perspective, the flow rate through the side stream cooler 150 could be very low, and for example, as low about 0.4 ft^3/sec or only 0.4/6.3=6.3% of the total cycle gas flow. For a 2 foot diameter reactor that is running at a normal 2 ft/sec superficial gas velocity, this would be approximately about 2,000 lb/hr of flow going to the side stream cooler versus 30,000 lb/hr of the main cycle gas flow in the main gas cycle stream 120. The 2,000 lb/hr of flow going to the side stream cooler or secondary cooler 150 would then be able to have its fluid temperature cooled below its dew point (dependent on the composition of the gas) and this would generate a two phase mixture of gas and liquid inside the side stream cooler 150.

A lower flow rate through the main cycle gas loop could allow condensing in the main cycle gas cooler 130, but this would cause other practical problems for the fluidization reactor 110. As the gas velocity in the reactor 110 is reduced, it moves the pilot plant operation further away from matching the fluidization velocity used in large scale commercial plants. A lower system gas velocity lowers the overall cycle gas flow to the cycle gas cooler 130 and results in poor heat, mass transfer inside the fluidized bed reactor 100 and causes poor temperature control, fluidization problems, sheeting or chunking of the polymer particles inside the reactor 110. The lower gas velocity and resulting lower flow rate in the cycle gas stream 120 also can cause problems with fouling of the cycle gas cooler or the distributor plate due to low fluid flow momentum. Accordingly, lowering the flow rate through the main cycle gas loop would not be sufficient to keep the bed fluidized adequately and is not a viable option to mimic large scale operations.

The side stream cooler or secondary cooler 150 and low flowrate in the side stream 155 also provide a way to eliminate the fluidization problems of a small pilot scale operation while keeping the main cycle gas flow consistent with that of a large, commercial operation. The low flowrate in the side stream 155 allows a higher percentage of the main cycle gas to flow to the reactor 110 to provide fluidization that mimics a large, commercial operation. As such, the methods and systems described herein provide a cost effective analytical tool to study, research, and troubleshoot commercial operations without the risks and expenses associated therewith.

EXAMPLES

Four test runs were performed to investigate and study the gel formation issues that had been observed in a commercial reactor running in condensed mode. It was believed that the gel formation was due to the presence of cold condensed liquids, and that these condensed liquids were creating a cold zone just above the distributor plate inside the reactor as the condensed liquids were flashing to vapor. Alternatively, it was thought that the colder temperature at the bottom zone of the reactor was causing the catalyst to produce a different polymer molecular weight and that this different polymer was the cause for the gels that were observed in the final polymer. The amount of gels in the final polymer was in the ppm (parts per million level), so it was thought that this small amount of the different cold temperature produced polymer was the culprit to observed gels in the final polymer.

Four semi-condensed mode test operations (Test Runs 1-4) were created in a pilot plant reactor system configured according to the system depicted in FIG. 1. A two-phase mixture was created by increasing the isopentane (IC5) concentration to about 9 mol % and cooling a side stream from the cycle gas in a secondary cooler to temperature less than 100° F., and feeding that cooled side stream directly in to the side of the reactor housing 110.

In Test Runs 1-4, the reactor housing 110 had a height of 10 ft and diameter of 2 ft (L/D ratio=5.0). The flowrate of the cycle gas in stream 120 was about 30,000 lb/hr with a gas velocity of 2.1 ft/sec. The catalyst was a hafnocene metallocene catalyst with MAO on silica that is commercially available from Univation Technologies, LLC, under the tradename XCAT™ VP-100. A summary of the reactor and process conditions is shown in Table 1 below.

TABLE 1

Process Summaries

|  | Test Run 1 | Test Run 2 | Test Run 3 | Test Run 4 |
|---|---|---|---|---|
| Residence Time (hr) | 5.59 | 5.58 | 5.63 | 4.65 |
| C2 Concentration (mol %) | 64.0 | 64.3 | 63.7 | 63.9 |
| C2 Partial Pressure (psia) | 201 | 202 | 200 | 201 |
| $H_2$ Concentration (ppm) | 275 | 251 | 318 | 317 |
| $H_2$/C2 Analyzer Ratio (ppm/mol %) | 4.29 | 3.90 | 4.99 | 4.96 |
| Hexene conc (mol %) | 1.03 | 1.04 | 1.08 | 1.30 |
| C6/C2 Gas ratio (mol/mol) | 0.0161 | 0.0162 | 0.0169 | 0.0203 |
| C2 Feed (lb/hr) | 154 | 146 | 160 | 181 |
| $H_2$/C2 Flow Ratio (mlb $H_2$/lb. C2) | 0.111 | 0.113 | 0.130 | 0.127 |
| C6/C2 Flow Ratio (lb/lb) | 0.0940 | 0.0944 | 0.0936 | 0.0935 |
| IC5 (mol %) | 1.4 | 1.9 | 9.1 | 9.5 |
| $N_2$ Conc (mol %) | 33.51 | 32.73 | 26.09 | 25.26 |
| Reactor Pressure (psia) | 313.6 | 314.0 | 313.6 | 314.6 |
| Bed Temperature (° F.) | 175.3 | 175.2 | 175.7 | 175.7 |
| Gas Velocity (ft/sec) | 2.10 | 2.10 | 2.10 | 2.10 |
| Bed Weight (lbs) | 726.1 | 724.7 | 684.5 | 684.5 |
| Fluidized Bed Density (lb/ft$^3$) | 18.77 | 18.39 | 18.23 | 18.11 |
| Dew Point ° F. (calculated) | 73.8 | 79.1 | 124.0 | 126.6 |
| Secondary Cooler Outlet Temp (° F.) | 74.2 | 78.8 | 86.6 | 84.8 |
| Cycle Gas Cooler Outlet Temp (° F.) | 152.8 | 155.5 | 159.3 | 158.3 |
| Production Rate (lb/hr) | 130.0 | 129.8 | 121.5 | 147.2 |
| Melt Index ($I_2$) | 0.96 | 0.47 | 0.57 | 0.56 |
| Flow Index ($I_{21}$) | 27.10 | 15.98 | 16.05 | 16.04 |
| MFR ($I_{21}/I_2$) | 28.47 | 34.15 | 28.16 | 28.57 |
| Density (gm/cm$^3$) | 0.9172 | 0.9149 | 0.9150 | 0.9152 |

Density was determined according to ASTM D-792.

Flow Index ($I_{21}$) was measured according to ASTM D-1238 at 190° C. and 21.6 kg.

Melt Index ($I_2$) was measured according to ASTM D-1238 at 190° C. and 2.16 kg.

The IC5 concentration increased from Test Run 1 to Test Run 4. In Test Run 4, the IC5 concentration was sufficient to get the secondary cooler outlet temperature below the dew point of the cycle gas stream, which allowed the condensables therein to condense. In Test Run 4, the cooled side stream 155 from the secondary cooler 150 had an isopentane concentration of about 9 mol % and about 5 wt % condensed liquids. This two phase stream was then fed to the side of the reactor 110 to purposely create a cold zone near the bottom of the reactor in order to study condensed mode operations on a smaller pilot plant scale. Heretofore, it was thought to be impossible to obtain condensed liquids in a continuous pilot scale operation, much less to obtain 5 wt % as obtained in Test Run 4.

Certain embodiments and features have been described using a set of numerical upper limits and a set of numerical lower limits. It should be appreciated that ranges from any lower value to any higher value are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process for testing a commercial polyolefin condensed mode operation on a pilot plant scale, comprising:
    flowing a feed stream comprising one or more olefin monomers and one or more inert fluids through a fluidized bed contained within a reactor housing, said reactor housing having a length of 2 to 25 feet, a diameter of 6 to 60 inches, and a length to diameter ratio of 1.0 to 20;
    contacting the one or more olefin monomers with one or more catalysts within the fluidized bed at conditions sufficient to produce a polyolefin at a rate of 1 to 150 lb/hr;
    withdrawing a cycle gas stream from the housing, the cycle gas stream having a gas velocity of 1.0 ft/sec to 3.0 ft/sec, having a mass flow rate of 10,000 lb/hr to 50,000 lb/hr, and comprising the unreacted monomers and the inert fluids;
    compressing the cycle gas stream to a pressure above the reaction pressure within the housing;
    cooling the cycle gas stream to a temperature that is above the dew point of the cycle gas;
    taking off a portion of the compressed cycle gas stream to create a side stream of the compressed cycle gas stream;
    cooling the side stream to a temperature that is below its dew point to create a gas-liquid mixture; and
    returning the cycle gas stream and the cooled side stream comprising the gas-liquid mixture to the reactor housing.

2. The process according to claim 1, wherein the cycle gas stream has a temperature of at least 150° F. and is cooled to a temperature of 90° F. to 120° F.

3. The process according to claim 1, wherein the side stream of the compressed cycle gas stream has a temperature of at least 150° F. and is cooled to a temperature of 70° F. to 120° F.

4. The process according to claim 1, wherein the one or more olefin monomers comprises ethylene.

5. The process according to claim 1, wherein the one or more inert fluids comprises propane, butane, isobutane, pentane, isopentane, hexane, isohexane, or any combination thereof.

6. The process according to claim 1, wherein the cycle gas stream comprises a recycle fluid recovered from the reactor housing.

7. The process according to claim 1, wherein the catalyst comprises one or more Ziegler-Natta catalysts, one or more chromium-based catalysts, one or more metallocene catalysts, one or more bimetallic catalysts, or any combination thereof.

8. The process according to claim 1, wherein the catalyst comprises at least one metallocene catalyst and at least one non-metallocene catalyst.

9. The process according to claim 1, wherein the catalyst comprises at least one metallocene catalyst and at least one Group 15-containing catalyst.

10. The process according to claim 1, wherein the catalyst comprises a silica supported hafnium transition metal metallocene/methylalumoxane catalyst system.

11. The process according to claim 1, wherein the cooled side stream has a mass flow rate of about 100 lb/hr to about 4,000 lb/hr.

12. The process according to claim 1, wherein the entire cycle gas is cooled prior to the compressor.

13. The process according to claim 1, wherein the cycle gas is cooled downstream of the compression step.

14. The process according to claim 1, wherein the side stream is taken off the cycle gas prior to the cooling step.

15. The process according to claim 1, wherein the side stream is taken off the cycle gas after the cooling step.

* * * * *